United States Patent [19]

Martin et al.

[11] Patent Number: 5,283,322

[45] Date of Patent: Feb. 1, 1994

[54] DEWATERING GLUTEN WITH NONIONIC SURFACTANTS

[75] Inventors: Roy W. Martin, LaGrange; Robert J. Denton, Lockport, both of Ill.

[73] Assignee: Betz Laboratories, Inc., Trevose, Pa.

[21] Appl. No.: 929,648

[22] Filed: Aug. 12, 1992

[51] Int. Cl.$^5$ .............................................. A23L 1/12
[52] U.S. Cl. ...................................... 530/374; 530/427
[58] Field of Search ................................. 530/374, 427

[56] References Cited

U.S. PATENT DOCUMENTS

| | | | |
|---|---|---|---|
| 3,362,829 | 1/1968 | Landfried et al. | 426/99 |
| 3,651,768 | 3/1972 | Hyppola | 426/331 |
| 3,880,824 | 4/1975 | Rao et al. | 530/374 |
| 3,958,016 | 5/1976 | Galle et al. | 426/61 |
| 4,108,847 | 4/1978 | Creinin et al. | 530/374 |
| 4,156,649 | 5/1979 | Quinn et al. | 210/749 |
| 4,411,927 | 10/1983 | Bermudez et al. | 426/618 |
| 4,428,984 | 1/1984 | Shimizu et al. | 427/220 |
| 4,551,261 | 11/1985 | Salihar | 252/88 |
| 4,929,361 | 5/1990 | Polizzotti | 210/698 |
| 5,019,564 | 5/1991 | Lowe et al. | 514/75 |

Primary Examiner—Howard E. Shain
Assistant Examiner—P. Lynn Touzeau
Attorney, Agent, or Firm—Alexander D. Ricci; Steven D. Boyd

[57] ABSTRACT

Methods of enhancing the dewatering of gluten are disclosed. The methods comprise adding a nonionic surfactant to the wet gluten prior to dewatering, as in vacuum dewatering equipment. Particularly effective surfactants are oxyalkylated sorbiton R surfactants when R is monooleate, trioleate, monostearate, tristearate, monopalmitate and monolaurate.

4 Claims, No Drawings

DEWATERING GLUTEN WITH NONIONIC SURFACTANTS

FIELD OF THE INVENTION

The present invention is directed to a method of improving the dewatering of gluten in grain processing. More specifically, the present invention is directed to the use of nonionic surfactants to enhance the dewatering activity of vacuum dewatering equipment employed in corn gluten processing.

BACKGROUND OF THE INVENTION

The present invention relates to the dewatering of gluten during corn processing. The wet milling processing of shelled corn is employed to obtain staple products such as corn oil, dextrose, corn syrup, high fructose corn syrup, dextrins, dry starches and feeds. The principle steps in the wet milling of corn include steeping, milling, recovering and processing. During the steeping operation, corn kernels are softened by soaking in a hot dilute solution of sulfurous acid (i.e., sulfur dioxide). The softened kernels are then passed through grinding mills and separators where the germ is removed and the starch and gluten are separated from the coarser hull and fibers. The starch is then separated from the gluten which is added to the fibrous material and processed into a high protein animal feed. The starch is recovered as dry starch or further processed into dextrose and fructose. The sulfurous acid steepwater initially used to soften the corn contains solubles which are recovered for use in feeds. The steepwater solids are recovered by evaporation and drying. The solids recovered from evaporating and drying the steep water are used as additives to livestock feeds to enhance their nutritional value.

Processing of the gluten also involves dewatering. Typically, the gluten stream is held in a light gluten storage tank prior to pumping to a bowl type centrifuge where the first step of dewatering begins. The gluten slurry from the centrifuge, called heavy gluten, is then sent to a vacuum dewatering system where the second step in the dewatering occurs. The gluten cake from the vacuum dewatering system is transported by auger to a dryer for final dewatering.

In the gluten dewatering process, the second step of vacuum dewatering is often the limiting factor in gluten recovery. The time necessary to teach the required gluten moisture content coupled with the potential for blinding of the filter media limits the throughput of gluten in this area. The present invention is directed to a process for decreasing the dewatering time and inhibiting blinding of the filter media in gluten dewatering.

The use of surfactants in grain processing is known. U.S. Pat. No. 3,362,829 discloses a process for coating powdered vital wheat gluten with a nonionic hydrophilic lipid selected from the class consisting of monoglycerides, salts of lactylic esters of fatty acids, polyoxyethylene stearate and stearyl monoglyceridyl citrate. The coating of the powdered wheat gluten with such nonionic hydrophilic lipids is disclosed as controlling wetting of the vital wheat gluten upon hydrogenation. The use of polyoxyethylene sorbitan monostearate in combination with hydrophilic lipids is also disclosed. The surface active agent, i.e., polyoxyethylene sorbitan monostearate is included as an aid for the initial dispersion of the vital wheat gluten.

U.S. Pat. No. 3,880,824 discloses a gluten/lipid complex and process for preparing a gluten/lipid complex in which vital wheat gluten complexes with lipids are prepared which are resistant to particle cohesion. A finely divided vital wheat gluten is reacted with ionic and nonionic fatty substances selected from the group consisting of fatty acid chlorides, fatty monoglycerides, lactylic esters of fatty acids, phospholipids and sorbitan fatty acid esters in the presence of a mild base catalyst. The phospholipids and lactylic esters of fatty acids yield comparable complexes in an acidic environment.

U.S. Pat. No. 4,929,361 discloses a method of controlling the fouling of heat transfer surfaces in evaporators and concentrators employed in wet corn milling which comprises treating the wet corn solution with a nonionic surfactant such as polyoxyethylene 20 sorbitan R.

SUMMARY OF THE INVENTION

The present invention provides a process to enhance the removal of water from wet gluten in a gluten dewatering operation. The present inventors discovered that the addition of a nonionic surfactant to a wet gluten stream prior to dewatering enhanced the dewatering ability of vacuum equipment. Particularly effective at enhancing vacuum dewatering are oxyalkylated sorbitan R surfactants where R is monooleate, trioleate, monostearate, tristearate, monopalmitate and monolaurate.

DESCRIPTION OF THE PREFERRED EMBODIMENT

The present inventors discovered that surfactants and more particularly nonionic surfactants effectively enhance the dewatering of gluten in vacuum dewatering equipment. Typically, in the processing of corn gluten the dewatering operation is the limiting factor in gluten recovery. Conventionally, the dewatering of gluten is a multiple step operation comprising centrifuge dewatering followed by vacuum dewatering and thereafter drying. The vacuum dewatering equipment limits gluten recovery due to the time consuming nature of the operation and possibly due to filter cloth plugging. Filter cloth plugging is especially a problem when polymers such as polyacrylamide type polymers have been added to the gluten stream.

The preferred surfactants in the process of the present invention are nonionic surfactants, particularly oxyalkylated sorbitan fatty esters. Representative surfactants are those surfactants marketed by ICI Americas Inc., under the trademark "Tween" label. The "Tween" label surfactants are polyoxyethylene 20 sorbitan R surfactants with R being a fatty acid moiety. The general structure of the polyoxyethylene sorbitan R is;

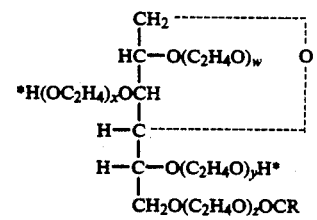

where $w+x+y+z=20$. When R equals monooleate the material is "Tween" 80 (polysorbate 80). When R=trioleate the material is "Tween" 85. When R=monostearate the material is "Tween" 60 and 61. When R=monopalmitate the material is "Tween" 40. When R=monolearate the material is "Tween" 20 and 21. For triesters, the hydrogens marked with an asterisk are replaced by RCO—.

It is also believed that the sugar modified surfactants such as octaglycerol monooleate or polyglycerol ester would also be effective. Such polyglycerol esters are known to be an effective replacement for polysorbates.

EXAMPLE

The effectiveness of the present invention at enhancing the vacuum dewatering in gluten processing was determined in filter leaf testing which employed filter cloth identical to that employed in a commercial gluten dewatering process. The filter testing was done on heavy gluten. 1000 milliliters samples of heavy gluten were treated with the material being tested and mixed with a gang stirrer. The treated gluten sample was then decanted into a large plastic container for ease in performing the filter leaf test. Vacuum readings were maintained at 18 inches of mercury throughout the test period. The testing was performed with a variety of polymeric surfactants including cationic, anionic and nonionic materials. The test procedures monitored: treatment type and dosage, time required to draw filtrate during forming, time required to observe a crack (vacuum break) during drawing, milliliters of filtrate collected, filtrate appearance, ease of cake release, and filter cloth appearance. Table 1 summarizes the test results. Table 2 describes the polymeric surfactants tested.

TABLE 1

| Treatment | Time (sec) to Draw Water | Time (sec) Vacuum Break | Volume (ml) Filtrate | Filtrate Recovery Rate(ml/sec) |
|---|---|---|---|---|
| 1ST RUN | | | | |
| Blank | — | 46 sec crack | 95 ml | — |
| Blank | — | 50 sec crack | 92.5 ml | — |
| Blank | 42 sec | 40 sec crack | 95.5 ml | 2.27 |
| A  150 ppm | 25 sec | 40 sec crack | 108 ml | 4.32 |
| A  150 ppm | 30 sec | 32 sec crack | 120 ml | 4.00 |
| A  150 ppm | 16 sec | 40 sec break | 113 ml | 7.06 |
| A  75 ppm | 24 sec | 44 sec crack | 101 ml | 4.20 |
| A  300 ppm | 30 sec | 39 sec crack | 101 ml | 3.36 |
| A  300 ppm | 27 sec | 35 sec crack | 105 ml | 3.89 |
| Blank | 28 sec | 39 sec crack | 102 ml | 3.64* |
| A  150 ppm | 28 sec | 30 sec crack | 107.5 ml | 3.84 |
| 2ND RUN | | | | |
| Blank | 33 sec | 60 sec crack | 96.5 ml | 2.92 |
| A  150 ppm | 29 sec | 44 sec crack | 102 ml | 3.51 |
| Blank | 33 sec | 41 sec crack | 98 ml | 2.97* |
| B  100 ppm | 40 sec | 40 sec crack | 93 ml | 2.33 |
|    200 ppm | 45 sec | 43 sec crack | 88 ml | 1.96 |
| C  100 ppm | 54 sec | 51 sec crack | 87 ml | 1.61 |
|    200 ppm | 47 sec | 42 sec crack | 87 ml | 1.85 |
| D  100 ppm | 36 sec | 37 sec crack | 94 ml | 2.61 |
|    200 ppm | 36 sec | 45 sec crack | 100 ml | 2.78 |
| E  100 ppm | 31 sec | 42 sec crack | 102 ml | 3.29** |
|    200 ppm | 34 sec | 35 sec crack | 99 ml | 2.91 |
| F  100 ppm | 30 sec | 41 sec crack | 105 ml | 3.50 |
| B  100 ppm plus FeSO4 50 ppm | 41 sec | 44 sec crack | 98 ml | 2.39 |
| 3RD RUN | | | | |
| Blank | 59 sec | 38 sec crack | 75 ml | 1.27 |
| A  150 ppm | 53 sec | 39 sec crack | 79 ml | 1.49 |
| Blank | 44 sec | 41 sec crack | 78 ml | 1.77* |
| A  150 ppm | 38 sec | 58 sec crack | 89 ml | 2.34 |
| F  100 ppm | 49 sec | 53 sec crack | 87 ml | 1.78* |

*Test results higher than expected due to preconditioning effect of previous test.
**Prior to this run the filter medium was flushed with water.

The treatment rates are ppm based on dry solids.

TABLE 2

| Treatment | Description |
|---|---|
| A | "Tween" 80 |
| B | Anionic acrylamide/sodium acrylate Emulsion Copolymer |
| C | Cationic Emulsion Polymer |
| D | Cationic Emulsion Polymer |
| E | Cationic Emulsion Polymer |
| F | Cationic Emulsion Polymer |

During testing, it was found that the nonionic surfactant polyoxyethylene 20 sorbitan R provided significant improvements in filtrate recover rate. Cationic and anionic surfactants did not provide similar improvements. On all occasions when a blank test followed a nonionic surfactant test, the blank performed better than previously run blank tests. This is believed to be due to residual nonionic surfactant adsorbing onto the filter media and thereby providing a residual effect. When nonionic surfactant tests were performed after blank tests, the results are slightly lower than back to back nonionic surfactant tests. This again is believed to be due to a residual or preconditioning effect.

The treatment range for the nonionic surfactant of the present invention can range from about 75 to about 300 parts per million based upon dry solids. The preferred treatment range is from about 75 to about 150 parts per million based upon dry solids. No additional benefit was seen when the treatment rate was increased from 150 parts per million to 300 parts per million.

The filtrate recovery rate will vary with changes in percent solids in the heavy gluten being treated. During testing, (Runs 1, 2 and 3) the percent solids off of the centrifuge varied from about 12 to 17%. However, in all cases treatments of 150 parts per million nonionic surfactant based upon dry solids out-performed the blank runs.

It is believed that the nonionic surfactant treatment of the present invention may be fed to the wet gluten prior to the centrifuge in order to reduce fouling of the centrifuge nozzles and bowl.

While the present invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A method of enhancing the dewatering of gluten which comprises adding to an aqueous gluten solution prior to dewatering, an effective dewatering amount of a nonionic surfactant.

2. The method of claim 1, wherein said nonionic surfactant is a polyoxyethylene 20 sorbitan R surfactant wherein R is selected from the group consisting of monooleate, trioleate monostearate, tristearate, monolaurate, and monopalmitate.

3. A method of enhancing vacuum dewatering of wet corn milling gluten which comprises adding to said wet gluten, prior to vacuum dewatering, an effective dewatering amount of a nonionic surfactant.

4. The method of claim 3, wherein said nonionic surfactant is a polyoxyethylene 20 sorbitan R surfactant wherein R is selected from the group consisting of monooleate, trioleate, monostearate, tristearate, monolaurate, and monopalmitate.

* * * * *